United States Patent

Genov et al.

[11] Patent Number: 6,059,516
[45] Date of Patent: May 9, 2000

[54] UNIVERSALLY TILTABLE Z AXIS DRIVE ARM

[76] Inventors: Genco Genov, 19173 Grystou La., San Jose Almadeu, Calif. 95120; Dimitre Todorov, deceased, late of Sunnyvale, Calif.; Alexander Todorov, executor, 165 Bernardo Ave., Apt. 14, Sunnyvale, Calif. 94086

[21] Appl. No.: 09/103,261

[22] Filed: Jun. 23, 1998

Related U.S. Application Data

[63] Continuation of application No. 08/661,292, Jun. 13, 1996.

[51] Int. Cl.$^7$ .................................................. B25J 11/00
[52] U.S. Cl. ........................................ 414/744.5; 901/15
[58] Field of Search .................... 414/744.5, 936; 901/15, 28, 29; 74/490.01, 490.05, 490.08; 187/267, 268

[56] References Cited

U.S. PATENT DOCUMENTS

| | | | |
|---|---|---|---|
| 4,196,046 | 4/1980 | Burns et al. | 176/19 R |
| 4,686,866 | 8/1987 | Rosheim | 74/479 |
| 4,732,525 | 3/1988 | Newmann | 414/729 |
| 4,794,513 | 12/1988 | Müller | 364/167.01 |
| 5,007,784 | 4/1991 | Genov et al. | 414/744.6 |
| 5,053,687 | 10/1991 | Merlet | 318/568 |
| 5,064,340 | 11/1991 | Genov et al. | 414/744.5 |
| 5,109,724 | 5/1992 | Delarue et al. | 74/479 |
| 5,116,190 | 5/1992 | Silke | 414/735 |
| 5,178,512 | 1/1993 | Skrobak | 414/744.5 |
| 5,656,906 | 8/1997 | Tsai | 318/568.21 |
| 5,715,729 | 2/1998 | Toyama et al. | 74/490.03 |
| 5,813,287 | 9/1998 | McMurty et al. | 74/490.06 |
| 5,813,823 | 9/1998 | Hofmeister | 414/744.5 |

FOREIGN PATENT DOCUMENTS

001668784  8/1991  Russian Federation.

*Primary Examiner*—Douglas Hess
*Attorney, Agent, or Firm*—Burns Doane Swecker & Mathis L.L.P.

[57] ABSTRACT

A tilting elevator is set forth. A rigid frame has a base, a structurally rigid structure extending upwardly from the base, and a flange attached to the structure top. The flange is generally parallel to the base. A movable elevatable structure is telescopically mounted to the rigid frame. The elevatable structure comprises upper and lower spaced apart generally parallel plates. At least three generally parallel rods extend between the plates and are connected to them by universal joints. A motor system is supported rigidly relative to the base. Each of the rods is movable relative to the plates independently of each other rod. A robotic arm having R-, θ- and Z-motion can be mounted to the elevator. A mechanism is preferably attached to the bottom plate of the elevatable structure for increasing the stability of the system. With the addition of a sensor and using microprocessor control, canted workpieces can be readily picked up.

20 Claims, 7 Drawing Sheets

UNIVERSALLY TILTABLE Z AXIS DRIVE ARM

This application is a continuation, of application Ser. No. 08/661,292, filed Jun. 13, 1996.

TECHNICAL FIELD

The present invention relates to an elevator which is useful for moving a robotic arm mechanism upwardly and downwardly and which further provides capability for tilting of the robotic arm mechanism.

BACKGROUND OF INVENTION

The use of robot arms for positioning and placing objects is well known. Generally, the arms have Z-, R- and θ-motion in a conventional cylindrical coordinate system. The capability of providing straight line motion is very important in the processing of semiconductor wafers so as to allow them to be very accurately positioned at a work station where processing steps take place. The R or straight line movement of the end effector or mechanical hand at the end of the arm has been accomplished in a number of manners.

As one example, telescoping arms have been utilized for this purpose. In such a structure one slidable member fits within another thus allowing linear extension of the arm.

More commonly, two link arms with equal length links have been utilized for this purpose. The links are connected to each other so that distal end of the first link is pivotally attached to the proximal end of the second link. The links utilize belt drives which are provided for coordinately rotating the second link to the first link to provide a rotation ratio, $i_{2,1}$ of 2/1, and to provide a rotation ratio, $i_{3,2}$, of 1/2 between the end effector and the distal link of the robotic arm. When $i_{2,1}$ is equal to 2/1 and $i_{3,2}$ is equal to 1/2, the result is that $i_{31}$, the rotation ratio of the end effector relative to the first link, is equal to 2/1×1/2 or unity and straight line motion results. In the case of 3 link arms, such as those shown in U.S. Pat. No. 5,064,340, the rotation ratio between the third and second links is 1/1 and other ratios are as just discussed above. In this situation $i_{21}$ is equal to 2/1, $i_{3,2}$ is equal to 1/1 and $i_{4,3}$ is equal to 1/2. This assures that $i_{4,1}$ is equal to unity and straight line motion results.

United Kingdom Patent Application GB 2193482A, published Feb. 10, 1988 discloses a wafer handling arm which includes two unequal length links with the distal end of one link being pivotally attached to the proximal end of the other link, with the hand being integral with the distal end of the distal link and which utilizes a belt drive which is fixed to a cam to attain nearly straight line motion.

It is also known to utilize an isosceles triangle type linkage wherein two equal length links are pivoted together and a mechanical hand is pivoted to the distal end of the distal link. Pulleys and belts are utilized in such a manner that the angle between the two links changes at twice the rate as do the angles that each of the links makes with a line connecting the points about which their other ends are pivoted. This linkage provides drive directly from a motor shaft to the proximal end portion of the proximal link. A belt about a stationary pulley coaxial with the motor shaft passes about a pulley at the point of pivoting of the two links to one another. Another pulley and belt arrangement provides pivoting of another pulley where the second link is pivotally connected to the mechanical hand.

In another apparatus a pair of isosceles triangle type linkages face one another and the mechanical hand is pivotally attached to the distal ends of both of the distal links. The proximal ends of each of the proximal links is driven in an opposite direction of rotation by a single rotating motor shaft, generally through use of appropriate gearing. What results is a frogs leg type of motion with each isosceles triangle type linkage serving as means for controlling the other such linkage in such a manner that the angles between the two links of each of the isosceles triangle linkages changes at twice the rate as do the angles that each of the links makes with a line connecting the points about which their other ends are pivoted.

There are a number of situations where it would be desirable to be able to tilt a robotic arm mechanism, as a whole, so as to allow better alignment for a particular task. One particular situation which comes to mind is the unloading of semiconductor wafers from cassettes. A typical semiconductor wafer cassette has a plurality of semiconductor wafers stacked one above the other and spaced apart from one another. Each wafer is generally held at its periphery by a narrow ledge with the great majority of the area of the wafer being untouched so as to avoid contamination or other problems. The wafers are generally loaded in the cassettes mechanically and occasionally one or more wafers in a cassette may end up misaligned, that is, canted, with one portion of the periphery upon a higher ledge than the diametrically opposite portion. In such an instance current robotic arms utilized in the semiconductor industry are not able to compensate and pick up the canted semiconductor wafer and deliver it for processing. This results in lost production. Furthermore, even if the wafers are originally loaded properly on the cassette, as the cassette is utilized, i.e., as it is, for example, advanced upwardly so that the next semiconductor wafer is ready for being picked up by a robotic arm, this very motion can cause one or more of the semiconductor wafers to be jiggled off of one of the ledges whereby the result is a semiconductor wafer having one edge held on a ledge and having the opposite edge at a lower level and bearing against the top of another semiconductor wafer. Prior to the present invention an adequate solution to this problem has not been available.

DISCLOSURE OF INVENTION

The present invention is directed to overcoming one or more of the problems set forth above.

In accordance with one embodiment of the invention an improvement is set forth in a workpiece handling system which comprises a robotic arm mechanism which provides R- θ- and Z-motion of an end effector. The robotic arm mechanism is mounted on an elevator for linear motion along the motion axis of the elevator. This provides Z-motion for the arm mechanism as a whole. The improvement comprises universal direction tilting means for tilting the elevator as a whole in all directions relative to its motion axis.

In accordance with another embodiment of the invention a tilting elevator is set forth. A rigid frame has a base, a structurally rigid structure extending upwardly from the base, and a flange attached to the structure top. The flange is generally parallel to the base. A movable elevatable structure is telescopically mounted to the rigid frame. The elevatable structure comprises upper and lower spaced apart generally parallel plates. Three generally parallel rods extend between the plates and are connected to them by universal joints. A stationary motor system is supported, generally by the base. Each of the rods is movable relative to the plates independently of each other rod. In accordance with still another embodiment of the invention a robotic arm having R-, θ- and Z-motion is mounted to the elevator.

In accordance with yet another embodiment of the invention a method is set forth for picking up misaligned workpieces from cassettes and the like using a robotic arm mounted to an elevator of the nature set forth above which further includes a sensor on the end effector which detects the misalignment and conveys the information to a computer controller which then controls motion of the end effector and tilting of the elevator so that the workpiece can be properly picked up.

The present invention provides apparatus and methods whereby misaligned, i.e., canted, semiconductor wafers or other workpieces can be picked up by a robotic arm mechanism and delivered for processing. Use of conventional computer control of the robotic arm mechanism can be combined with sensor input from the end effector. This allows for the coordinated R-, θ- and Z-motion of the robotic arm mechanism and tilting of the elevator relative to the Z-axis to accomplish the pickup. The result is less down time and increased throughput for a semiconductor processing or other operation.

BRIEF DESCRIPTION OF THE DRAWINGS

The invention will be better understood by reference to the figures of the drawings wherein like numbers denote like parts throughout and wherein.

DETAILED DESCRIPTION OF INVENTION

While the invention in at least some of its aspects is useful in a number of different environments, it has been designed with the idea in mind of its being used with a robotic arm mechanism of the nature used for positioning specific workpieces, namely semiconductor wafers, during their processing. Accordingly, the discussion which follows will utilize terms common to that industry, including terms such as wafers, end effectors, etc. However, it should be noted that the invention is not so limited and that other workpieces than semiconductor wafers may be picked up and/or positioned in accordance with the present invention and that apparatus other than robotic arm mechanisms may be mounted to the elevator of the present invention.

For a better understanding of the invention it should be noted that the terms "belt", "belt means", "pulley" and "pulley means" are, at times, referred to as gearing. It should further be understood that the terms "belt" and "belt means" are used broadly to include toothed and untoothed constructions, chains, fabric belts, woven belts and the like. They may be constructed of any suitable material, natural or synthetic, organic, inorganic, polymeric, composite or metallic. Likewise the terms "pulley" and "pulley means" are used broadly to include toothed and untoothed constructions, constructions which positively engage with respective belts or which engage only frictionally with such belts. They too may be constructed of any suitable material, natural or synthetic, organic, inorganic, polymeric, composite or metallic. With this in mind the following detailed discussion of the invention will be set forth. It should further be noted that the term "rod" includes tubular members.

FIGS. 1, 6, 6A, 7, 7A and 8 illustrates a generally universally tiltingly adjustable elevator structure 10 in accordance with the present invention. The elevator is shown both in its retracted form (in solid lines) and in its expanded form (in dashed lines).

Figure 1:
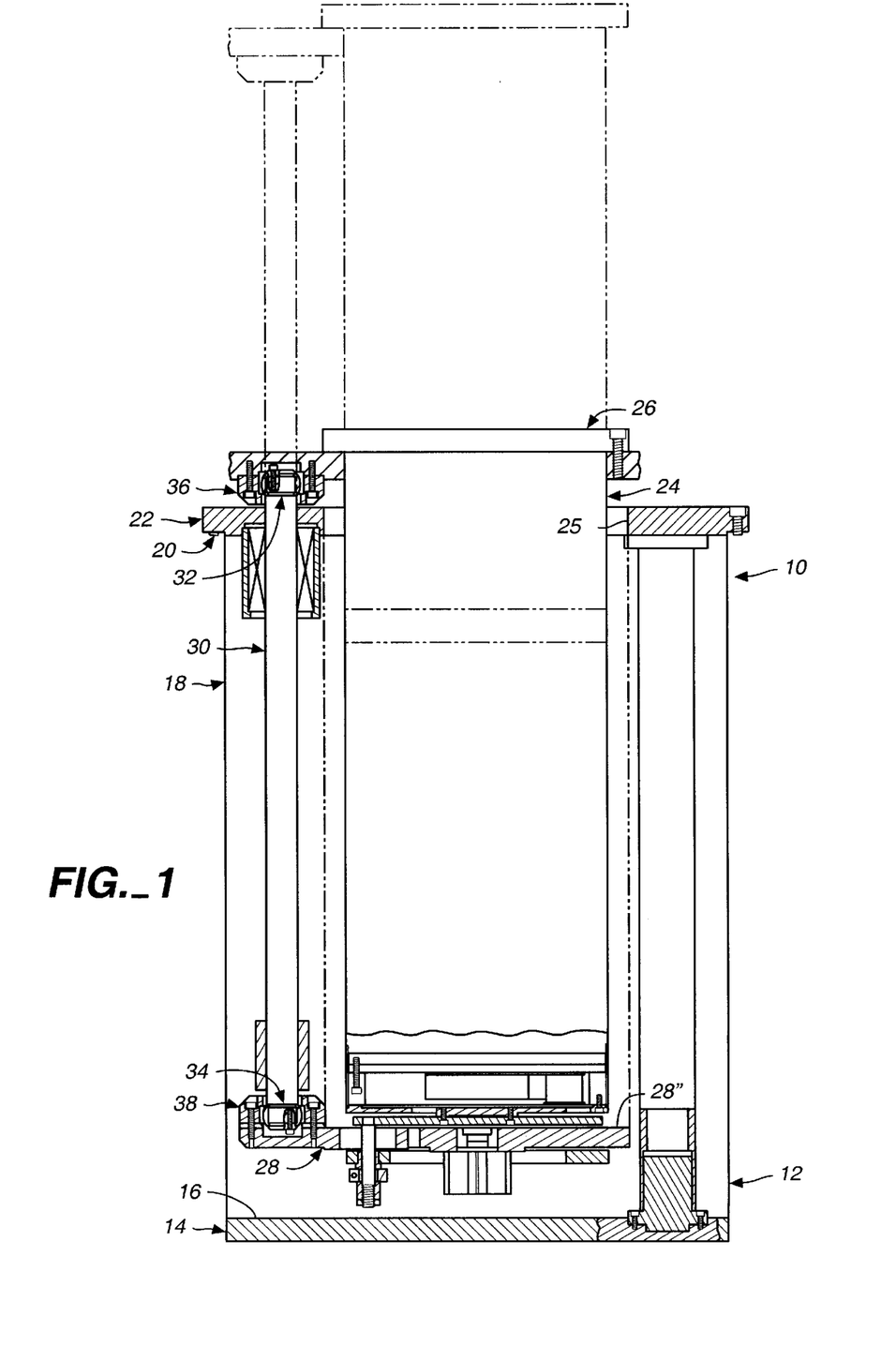
FIG. 1 illustrates, in side sectional view, with an outwardly telescoped mode being shown in dashed lines, an elevator structure in accordance with an embodiment of the present invention.

The elevator structure 10 is made up of two distinct portions, namely, a rigid frame 12 which includes a base 14 having an upwardly facing generally planar surface 16, a rigid vertical structure 18 having a structure upper end portion 20, the rigid structure 18 extending upwardly generally orthogonally from the planar surface 16 to the structure upper end portion 20 and a flange 22 attached to the structure upper end portion 20, the flange 22 being generally parallel to the planar surface 16.

The second part of the elevator 10 is a movable elevatable structure 24 which is telescopically mounted to the rigid frame 12. It moves up and down through an opening 25 in the flange 22. The movable elevatable structure 24 includes an upper plate 26, a lower plate 28 which is positioned at a spaced distance from and generally parallel to the upper plate 26 and at least three non-coplanar linearly extending generally parallel members 30. Each of the members 30 has a respective upper end portion 32 and a respective lower end portion 34. Each of the members 30 extends from the upper plate 26 to the lower plate 28. The members 30 are each generally (but not exactly during tilting) orthogonal relative to the plates 26 and 28. Generally, the non-coplanar members are substantially equally spaced about the peripheries of the upper plate 26 and the lower plate 28.

A plurality of upper universal joints 36 are supported by the upper plate 26. The number of upper universal joints 36 is equal to the number of linearly extending members 30. Each of the upper universal joints 36 is arranged to universally mount the respective upper end portion 32 of a respective one of the linearly extending members 30 to the upper plate 26. Likewise, there are a plurality of lower universal joints 38 which are supported by the lower plate 28. The number of lower universal joints 38 is equal to the number of linearly extending members 30. Each of the lower universal joints 38 is arranged to universally mount the respective lower end portion 34 of a respective one of the linearly extending members 30 to the lower plate 28.

Figure 2:
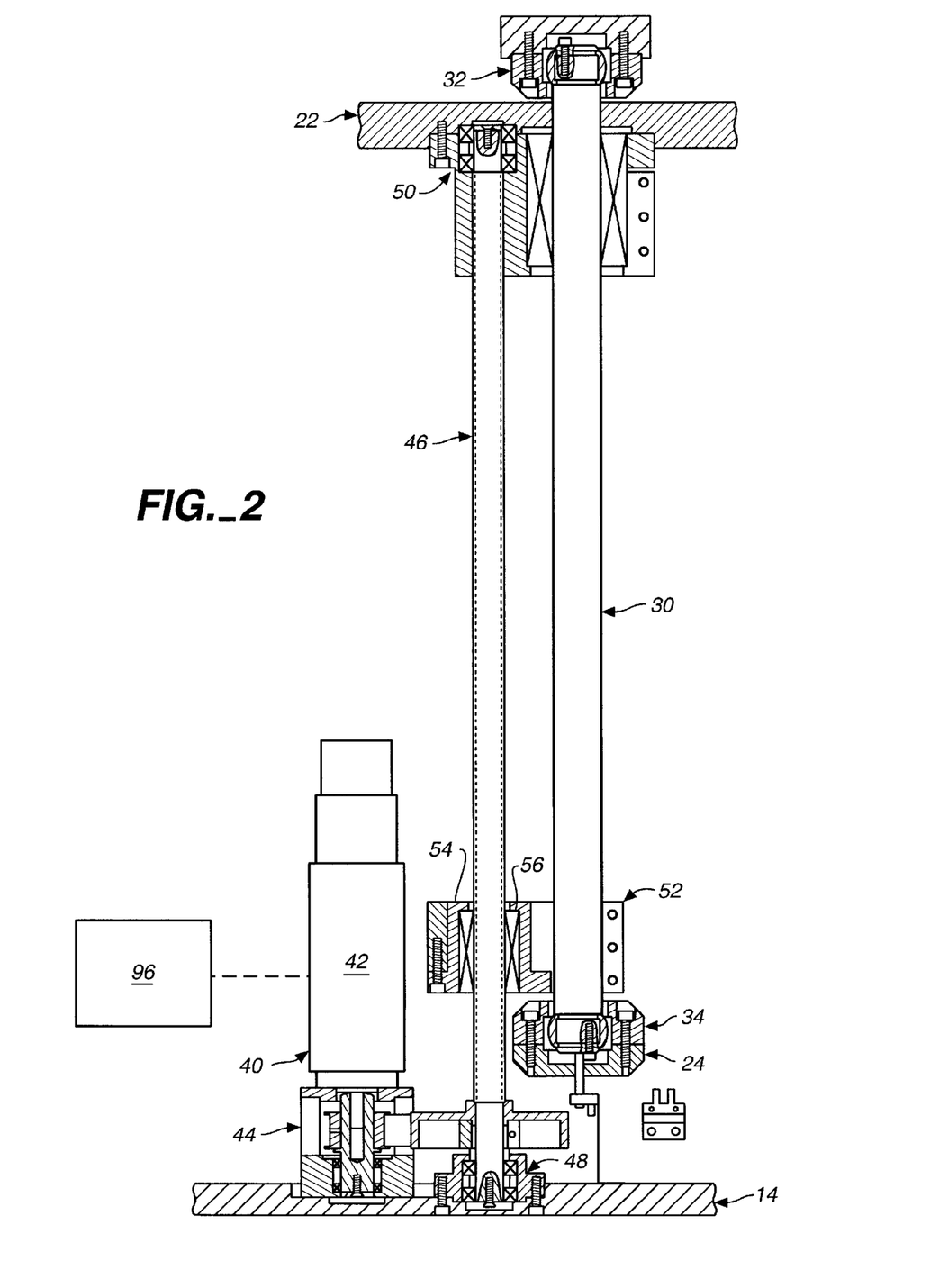
FIG. 2 illustrates, in enlarged side section view, a portion of the apparatus illustrated in FIG. 1 along with one of the motors used for tilting the elevator.

Motor means 40, as seen in FIG. 2, is rigidly supported, generally by the base 14. It serves for motivating each of the linearly extending members 30 independently of each other of the linearly extending members 30 toward and away from the base 14. The preferred motor means comprises three separate motors, one of which, 42, is shown in FIG. 2. Each motor operates via a respective belt and pulley arrangement 44 to rotate a respective lead screw 46 which is mounted for rotation relative to the base 14 and to the flange 22. A bracket 52 is attached to the linearly extending member 30 and has an extending arm 54 which defines a bore 56 which includes a thread follower structure 57, for example, a ball screw bearing (preferred) or mating threads, which engages with the lead screw 46. Thereby, rotation of the lead screw 46 under the impetus of the motor 42 causes the bracket 52 to move in a direction determined by the direction of rotation of the motor 42 which in turn leads to linear motion of the linearly extending member 30 (and to tilting of the upper plate 26 and of the lower plate 28 if all motors are not operating identically). A single motor along with a more complex pulley/belt arrangement and appropriate gearing and/or clutching can alternatively be utilized.

Figure 3:
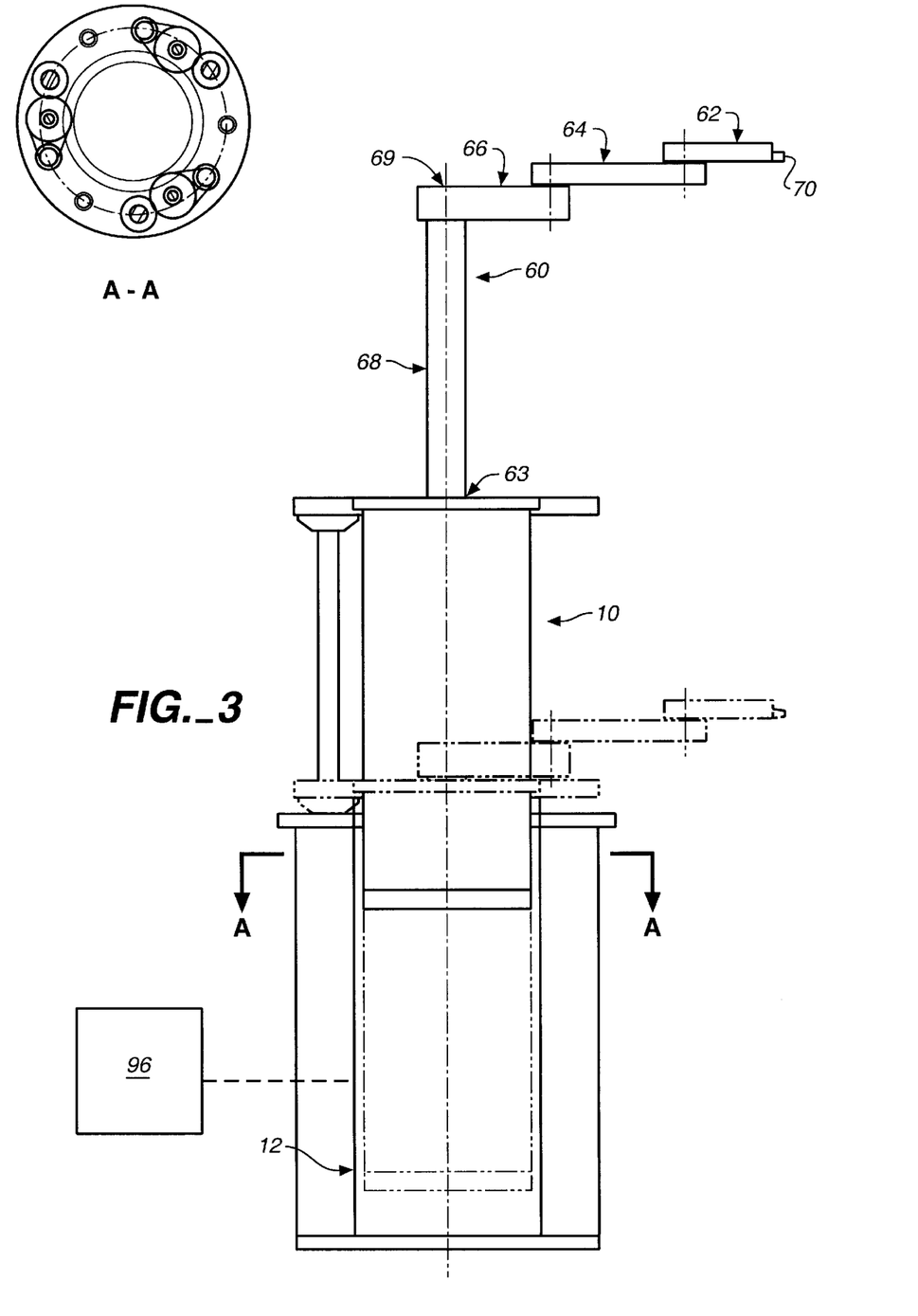
FIG. 3 illustrates, schematically, in both collapsed and extended form, an elevator as illustrated in FIG. 1 to which a robotic arm mechanism is mounted with the robotic arm mechanism having a sensor as part thereof.

The elevator structure 10 in accordance with the present invention is generally useful in combination with an article positioning apparatus 60 as seen in FIG. 3 which can be suitably mounted to the elevatable structure 24, generally to the upper plate 26 or to the lower plate 28. As shown it is mounted to the upper plate 26. Typically, the article positioning apparatus 60 will be in the nature of a robotic arm apparatus. The particular apparatus illustrated includes an end effector 62 pivotally connected to a forearm 64 which is in turn pivotally connected to a proximal arm 66, which is pivotally connected about an axis 69 to a post 68 which can be conventionally motivated to move vertically to provide Z-axis motion. Appropriate conventional drive means are also provided which provide both R- (straight line) and θ- (rotational) motion about the axis 69. The end effector 62 would conventionally include vacuum pickup means which are useful for picking up semiconductor wafers and the like. All are conventionally controlled by control means, generally a computer circuit (not illustrated).

A suitable position measuring sensor system 70, can include a) signal transmitting means for transmitting a first signal (e.g., a photo or a sonic signal) longitudinally forward from the distal end of the end effector 62 parallel to the workpieces, b) signal detector means (e.g., a photo or a sonic signal detector) for providing a signal indicative of impinging incident energy, and c) energy gathering and transmitting means for gathering energy caused by reflection of the first signal from a workpiece and transmitting such energy to the signal detector means. Status signal transmitting means are provided for transmitting a signal to the control means indicative of the presence or absence of energy caused by reflection of the first signal from a respective one of the workpieces.

The position measuring sensor system 70 can be provided on the end effector 62 for detecting whether or not any wafer to be picked up is properly aligned or is misaligned and somehow canted. In the latter instance the elevator structure 10 can be utilized to tilt the entire article positioning apparatus 60 so that the vacuum pickup on the end effector 62 is aligned to properly pick up the wafer. Thereafter, the tilt of the elevator structure 10 can be adjusted utilizing the motor means 40 so that the wafer is in proper position for delivery to a chuck for prealignment purposes and/or to a wafer processing station in a semiconductor processing operation. As will be noted by reference to FIG. 3, the article positioning apparatus 60 is shown in two positions, one corresponding to full retraction of both the rod 68 and the elevator 10 and the other corresponding to at least partial extension of the elevator 10 and the article positioning apparatus 60.

The article positioning apparatus 60 has a bottom portion 63 which is supported by the upper plate 26 in the embodiment illustrated. The article positioning apparatus 60 extends upwardly through the generally central opening 25 in the flange 22 to above the upper plate 26. In the particular embodiment illustrated in FIGS. 4 and 5 there are three lead screw/bracket/linearly extending member combinations (one is shown) equally spaced around the flange 22 which, in this instance, is circular in shape. Rigidity to the structure is provided by the rigid vertical structure 18 which in the particular embodiment illustrated comprises three tubes which are rigid and which are attached from the base 14 to the flange 22.

Figure 4:
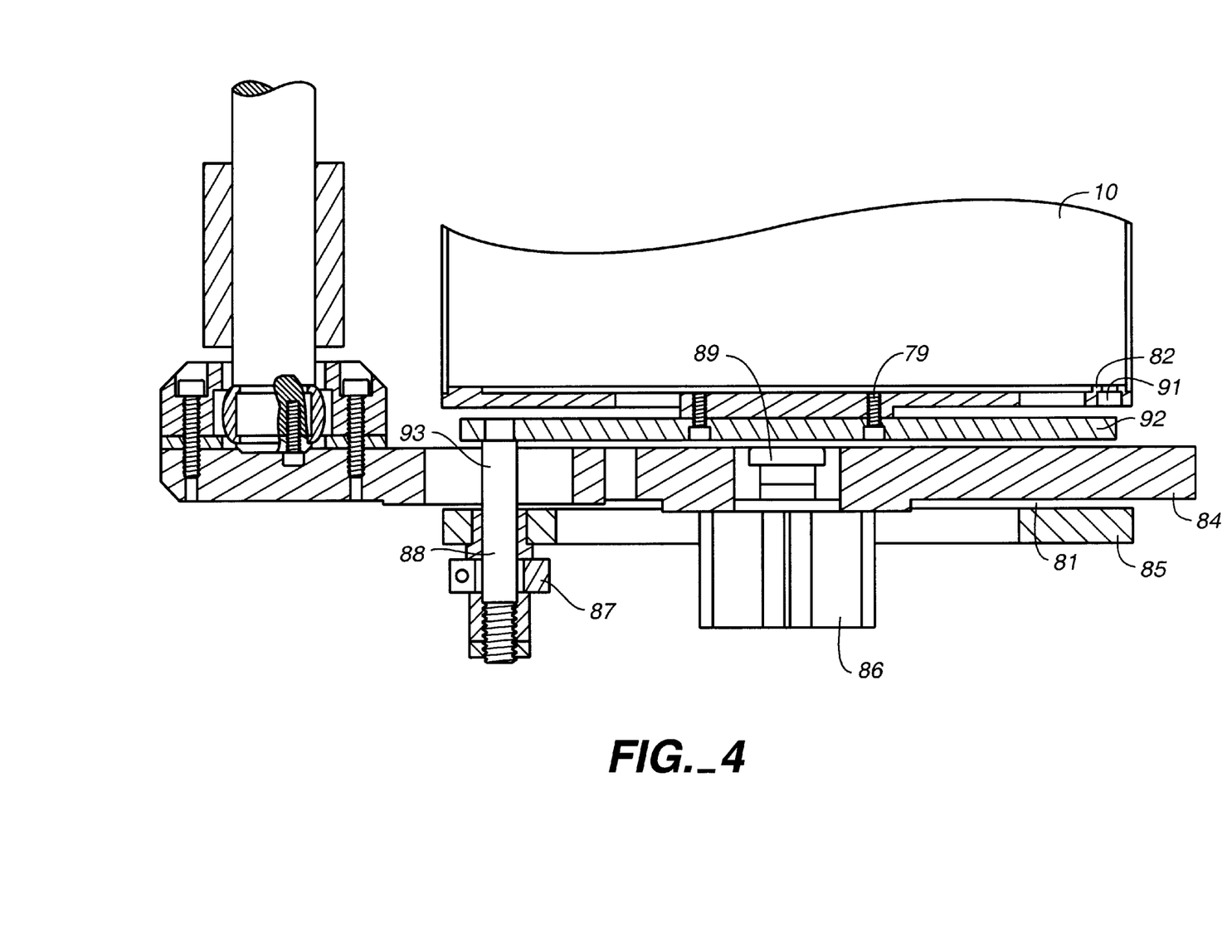
FIG. 4 illustrates, in partial enlarged side sectional view, details of construction of a lower portion of an elevator structure useful in accordance with the embodiments of the present invention.
Figure 5:
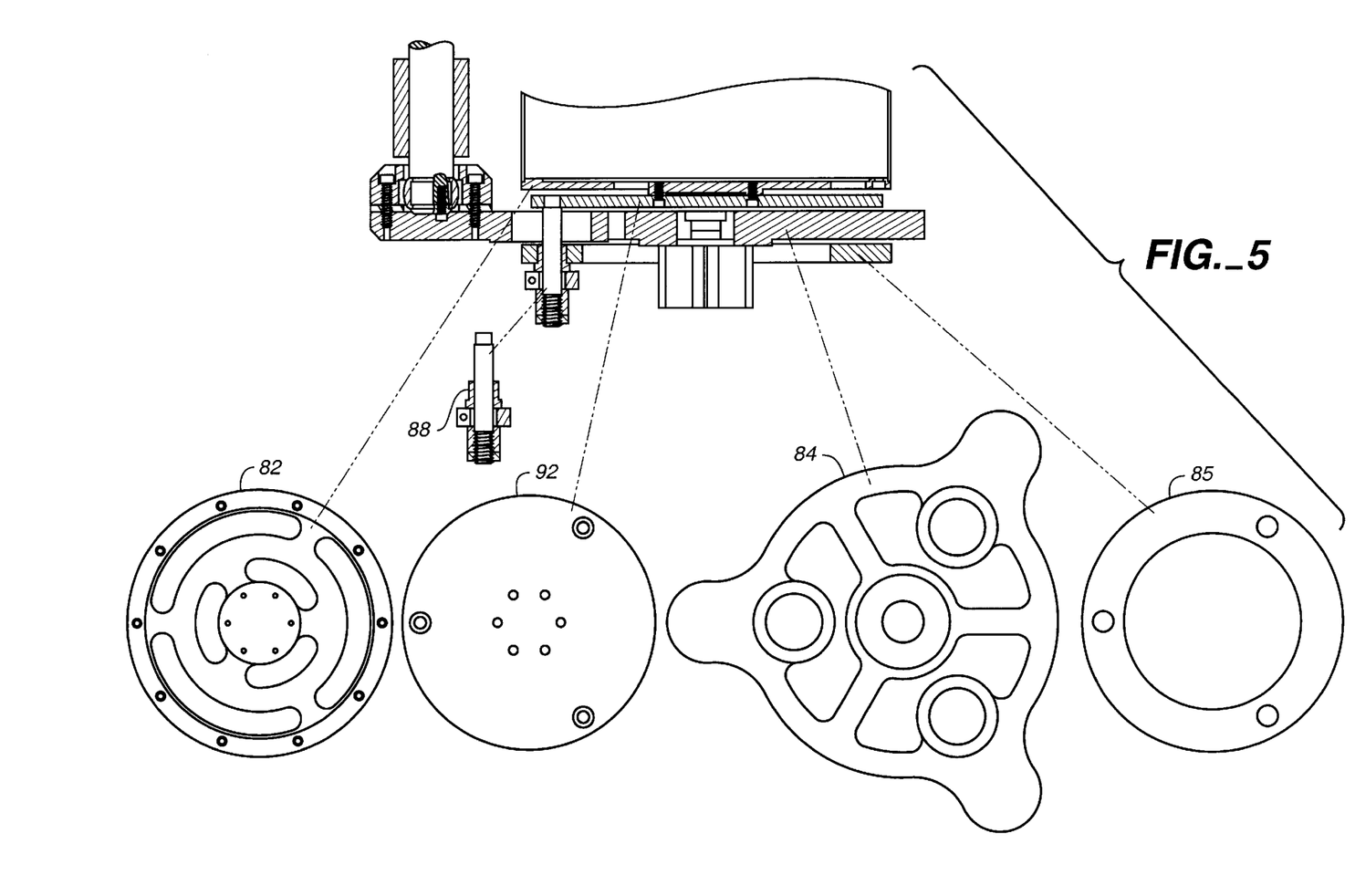
FIG. 5 illustrates, in a view similar to FIG. 4 but with individual parts separately shown in a side and in plan views, details in the elements illustrated in FIG. 4.
Figure 6:
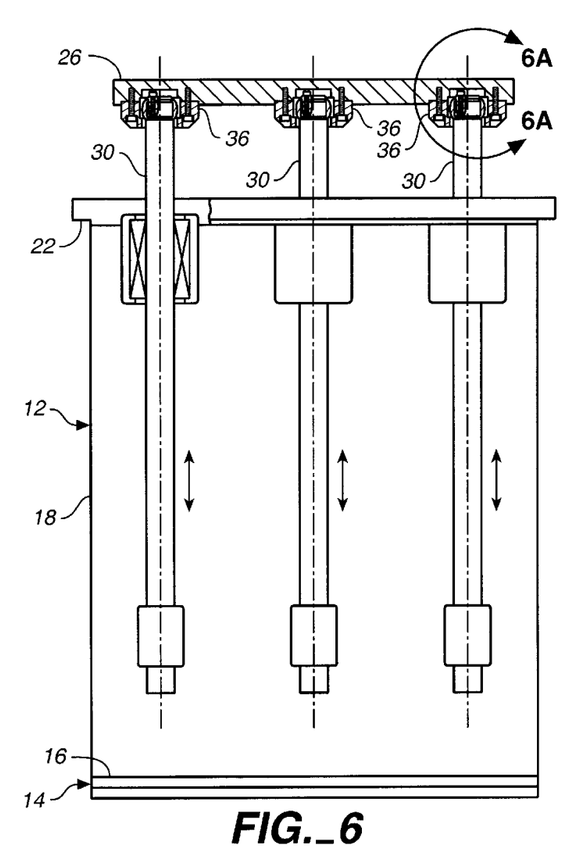
FIG. 6 illustrates, in side elevational view, a portion of the apparatus in an untilted position.
Figure 6A:
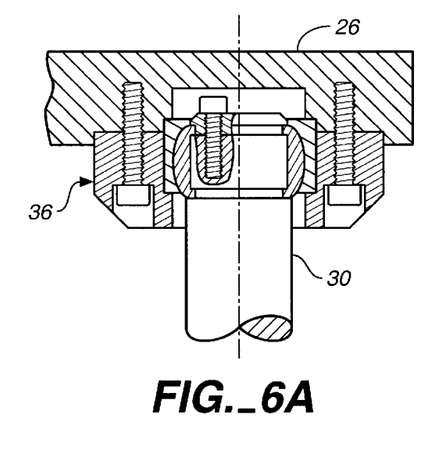
FIG. 6A illustrates a blow up view of one of the universal joints of FIG. 6.
Figure 7:
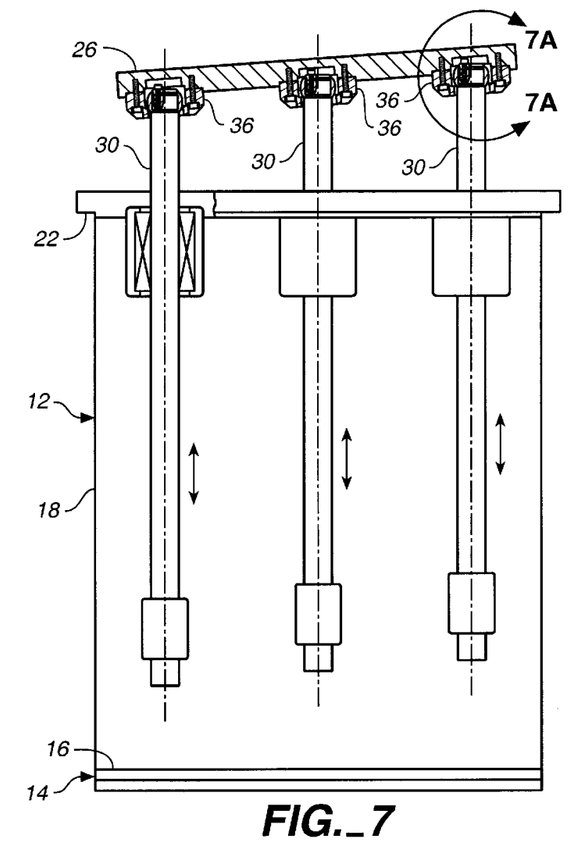
FIG. 7 illustrates, in side elevational view, a portion of the apparatus of the invention in a tilted position.
Figure 7A:
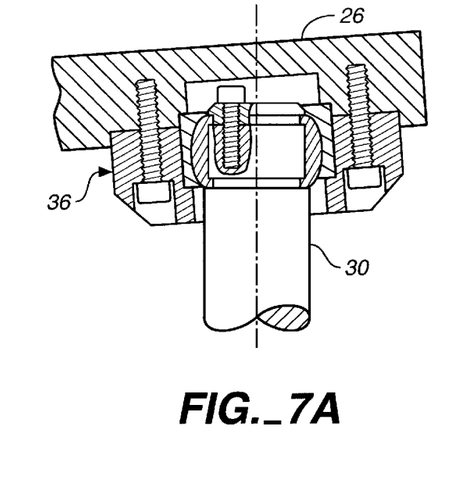
FIG. 7A illustrates a blow up view of one of the universal joints of FIG. 7.
Figure 8:
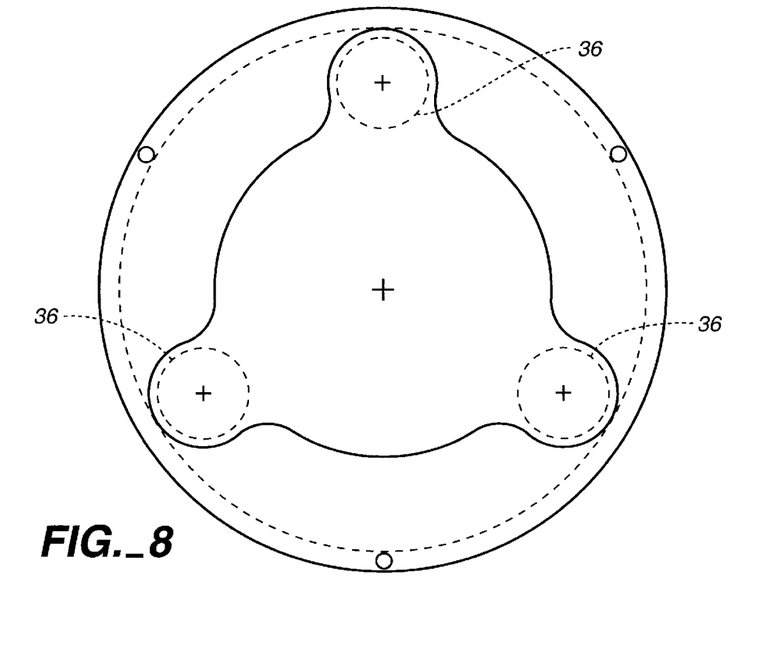
FIG. 8 illustrates a top plan view of the portion of FIG. 7.

As seen in FIG. 4, a pneumatic pressure cylinder 86 is attached to a first membrane 84. A flange 92 is rigidly attached to a second membrane 82 with bolts 79. After activation of the pressure cylinder 86 a cylinder rod 89 applies a force upon the flange 92. The flange 92 transmits this force to the second membrane 82. As a result, the second membrane 82, which is rigidly attached with bolts 91 to the bottom of the elevator 10, bows upwardly. At the same time, the first membrane 84 has a tendency to bow downwardly.

Another mechanism is provided to control the deformation of the membranes 82 and 84. A flange 85 is spaced apart from and under the first membrane 84. A structure 88 is attached with its upper end portion 93 attached to the flange 92. The structure 88 passed through the first membrane 84 in non-contacting relation and has its bottom portion attached to the flange 85. An adjustment mechanism 87 allows the flange 85 to be positioned closer to or further from the first membrane 84. Accordingly, a gap 81 as defined between the flange 85 and the first membrane 84, determines the travel of the cylinder rod 89 and thereby the extent of the deformation of the first and second membranes 84, 82.

More generally, it will be seen that the invention is concerned with a workpiece handling system, i.e. a combined elevation and article positioning apparatus, which comprises a robotic arm mechanism which provides R-, θ- and Z-motion of an end effector 62 which is adapted to pick up and transport workpieces. The robotic arm mechanism is mounted on an elevator structure 10 for linear motion along a motion axis of the elevator structure 10 to provide Z-motion for the robotic arm mechanism as a whole. The improvement of the invention comprises universal direction tilting means for tilting the floor and ceiling of the movable elevatable structure 24 in all directions relative to its motion axis 69.

In accordance with the present invention, and making use of an apparatus generally as set forth above, a method is provided for picking up an ostensibly horizontally lying generally planar workpiece which is misaligned from the horizontal and which is one of a plurality of stacked spaced apart workpieces. Basically the end effector is moved to the vicinity of the workpieces. The sensor 70 on the end effector 62 is utilized to measure the alignment of each workpiece prior to its being picked up. When any of the workpieces are misaligned, the degree of misalignment is measured and communicated to computer control means 96 shown in FIGS. 2 and 3. The computer control means 96 is utilized to control the motor means 40 and the article positioning apparatus to align the end effector 62 to pick up the misaligned workpiece. The motor means 40 is then controlled again to position the workpiece in the desired horizontal orientation.

INDUSTRIAL APPLICABILITY

The present invention provides a tiltable elevator structure 10 for use with an elevatable robotic arm structure 60 and is useful for a number of things, particularly for semiconductor wafer processing.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A universally tiltingly adjustable elevator structure for positioning an apparatus for picking up an article, comprising:
    a rigid frame comprising:
        a rigid structure having a structure upper end portion; and
        a flange attached to the structure upper end portion; and
    a movable and tiltable elevatable structure telescopically mounted to the rigid frame, comprising:
        a plate;
        at least three non-coplanar linearly extending generally parallel members, each of the members having a respective upper end portion and a respective lower end portion, each of the members connected to the plate, the members each being generally orthogonal relative to the plate;
        a plurality of universal joints supported by the plate, the number of universal joints being equal to the number of linearly extending members, each of the universal joints being arranged to universally mount a portion of a respective one of the linearly extending members to the plate; and
    motor means for motivating each of said linearly extending members independently of each other of said linearly extending members selectively upwardly and downwardly with respect to the rigid frame.

2. An elevator structure as set forth in claim 1, wherein the motor means comprises:
    a plurality of individual motors supported by the rigid frame, the number of motors being equal to the number of linearly extending members, each of the motors being connected to motivate a corresponding one of the linearly extending members selectively upwardly and downwardly.

3. An elevator structure as set forth in claim 2, wherein the connection of each of the motors to motivate the corresponding one of the linearly extending members comprises:
    a plurality of lead screws supported on the rigid frame and being rotatable relative thereto, the number of lead screws being equal to the number of linearly extending members, each lead screw being located adjacent and parallel to a respective one of the linearly extending members, each of the motors being connected to rotate a corresponding one of the lead screws; and
    a plurality of brackets, the number of brackets being equal to the number of linearly extending members, each bracket being attached to a respective one of the linearly extending members, each of the brackets having an arm extending from the respective linearly extending member to a distal portion thereof, each distal portion having a bore therethrough which includes a thread follower which engages with the corresponding lead screw in such a manner that rotation of the lead screw imparts linear motion upwardly and downwardly to the corresponding linearly extending member.

4. An elevator structure as set forth in claim 3, wherein the connection of each of the motors to motivate the corresponding one of the linearly extending members further comprises:
    a plurality of belt means, the number of belt means being equal to the number of motors, each belt means being driven by a corresponding one of the motors and being engaged to rotate a corresponding one of the lead screws.

5. The elevator structure as set forth in claim 1, wherein the number of universal joints is limited to three and the number of linearly extending members is limited to three.

6. The elevator structure as set forth in claim 1, wherein each universal joint operates to universally mount only one linearly extending member to the plate.

7. A combined elevation and article positioning apparatus, comprising:
    a rigid frame comprising:
        a rigid structure having a structure upper end portion; and
        a flange having a generally centrally positioned opening therethrough, the flange being attached to the structure upper end portion; and
    a movable elevatable structure telescopically mounted to the rigid frame, comprising:
        a plate;
        at least three linearly extending generally parallel members, each of the members having a respective upper end portion and a respective lower end portion, each of the members connected to the plate, the members each being generally orthogonal relative to the plate;
        a plurality of universal joints supported by the plate, the number of upper universal joints being equal to the number of linearly extending members, each of the universal joints being arranged to universally mount an end portion of a respective one of the linearly extending members to the plate;
    motor means for motivating each of the linearly extending members independently of each other of said linearly extending members upwardly and downwardly with respect to the rigid frame; and
    an article positioning apparatus supported by the elevatable structure, the article positioning apparatus extending upwardly through the generally central opening in the flange.

8. An apparatus as set forth in claim 7, wherein the elevatable structure further includes:
    a second plate of the movable elevatable structure; and
    rigidity increasing means attached to the second plate of the movable elevatable structure for increasing the rigidity of a bottom portion of the movable elevatable structure.

9. An apparatus as set forth in claim 8, wherein the rigidity increasing means comprises:
    biasing means for biasing the bottom portion of the movable elevatable structure.

10. An apparatus as set forth in claim 7, wherein the motor means comprises:

a plurality of individual motors supported by the rigid frame, the number of motors being equal to the number of linearly extending members, each of the motors being connected to motivate a corresponding one of the linearly extending members upwardly and downwardly.

11. An apparatus as set forth in claim 10, wherein the connection of each of the motors to motivate the corresponding one of the linearly extending members comprises:

a plurality of lead screws supported in the rigid frame and being universally rotatable relative thereto, the number of lead screws being equal to the number of linearly extending members each lead screw being located adjacent and parallel to a respective one of the linearly extending members, each of the motors being connected to rotate a corresponding one of the lead screws; and a plurality of brackets, the number of brackets being equal to the number of linearly extending members, each bracket being attached to a respective one of the linearly extending members, each of the brackets having an arm extending from the respective linearly extending member to a distal portion thereof, each distal portion having a bore therethrough which includes a thread follower which engages with the corresponding lead screw in such a manner that rotation of the lead screw imparts linear motion to the corresponding linearly extending member.

12. An apparatus as set forth in claim 11, wherein the connection of each of the motors to motivate the corresponding one of the linearly extending members further comprises:

a plurality of belt means, the number of belt means being equal to the number of motors, each belt means being driven by a corresponding one of the motors and being engaged to rotate a corresponding one of the lead screws.

13. An apparatus as set forth in claim 10, wherein the connection of each of the motors to motivate the corresponding one of the linearly extending members comprises:

a plurality of lead screws supported by the rigid frame and being universally rotatable relative thereto, the number of lead screws being equal to the number of linearly extending members, each lead screw being located adjacent and parallel to a respective one of the linearly extending members, each of the motors being connected to rotate a corresponding one of the lead screws;

a plurality of brackets, the number of brackets being equal to the number of linearly extending members, each bracket being attached to a respective one of the linearly extending members, each of the brackets having an arm extending from the respective linearly extending member to a distal portion thereof, each distal portion having a bore therethrough which engages with the corresponding lead screw in such a manner that rotation of the lead screw imparts linear motion to the corresponding linearly extending member; and a plurality of belt means, the number of belt means being equal to the number of motors, each belt means being driven by a corresponding one of the motors and being engaged to rotate a corresponding one of the lead screws.

14. The elevator structure as set forth in claim 7, wherein the number of linearly extending members does not exceed the number of universal joints.

15. The elevator structure as set forth in claim 14, wherein the number of linearly extending members is three.

16. A combined elevation and article positioning apparatus, comprising:

a rigid frame comprising:
a rigid structure having a structure upper end portion; and
a flange having a generally centrally positioned opening therethrough, the flange being attached to the structure upper end portion; and a movable elevatable structure telescopically mounted to the rigid frame, comprising:
a plate:
at least three linearly extending generally parallel members, each of the members having a respective upper end portion and a respective lower end portion, each of the members connected to the plate, the members each being generally orthogonal relative to the plate;
a plurality of universal joints supported by the plate, the number of universal joints being equal to the number of linearly extending members, each of the universal joints being arranged to universally mount an end portion of a respective one of the linearly extending members to the plate;

motor means for motivating each of the linearly extending members independently of each other of said linearly extending members upwardly and downwardly with respect to the rigid frame;

an article positioning apparatus supported by the elevatable structure, the article positioning apparatus extending upwardly through the generally central opening in the flange;

a second plate of the movable elevatable structure; and rigidity increasing means attached to the second plate of the movable elevatable structure for increasing the rigidity of a bottom portion of the movable elevatable structure, the rigidity increasing means comprising biasing means for biasing the bottom portion of the movable elevatable structure, the biasing means comprising:
a bias transmitting structure located below and spaced apart from the second plate;
attachment means having a lower portion attached to and extending upwardly from the bias transmitting structure and through the second plate in non-contacting relation thereto, the attachment means having an upper portion attached to the bottom portion of the movable elevatable structure; and
force exerting means for exerting a force upwardly from the second plate against the bottom portion of the movable elevatable structure.

17. An apparatus as set forth in claim 16, wherein the force exerting means comprise a pneumatic cylinder.

18. A method for picking up an ostensibly horizontally lying generally planar workpiece which is misaligned from the horizontal and which is one of a plurality of stacked spaced apart workpieces, the method comprising:

providing a combined elevation and article positioning apparatus, comprising:
a rigid frame comprising:
a rigid structure having a structure upper end portion; and
a flange having a generally centrally positioned opening therethrough, the flange being attached to the structure upper end portion; and a movable elevatable structure telescopically mounted to the rigid frame, comprising:

a plate;

at least three linearly extending generally parallel spaced apart non-coplanar members, each of the members having a respective upper end portion and a respective lower end portion, each of the members pivotally connected to the plate, the members each being generally orthogonal relative to the plates;

a plurality of universal joints supported by the plate, the number of universal joints being equal to the number of linearly extending members, each of the universal joints being arranged to universally mount a portion of a respective one of the linearly extending members to the plate; and motor means supported rigidly relative to the rigid frame for motivating each of said linearly extending members independently of each other of said linearly extending members upwardly and downwardly; and an article positioning apparatus supported by the elevatable structure, the article positioning apparatus extending upwardly through the generally central opening in the flange to above the plate, the article positioning apparatus; having an end effector including a sensor for determining the alignment of each of the workpieces, the article positioning apparatus including computer control means for controlling the operation of the article positioning apparatus and of the motor means, the sensor communicating with the computer control means;

moving the end effector to the vicinity of the workpieces;

utilizing the sensor to measure the alignment of each workpiece prior to picking it up;

when any of the workpieces are misaligned communicating the degree of misalignment to the computer control means; and utilizing the computer control means to control the motor means and the article positioning apparatus to align the end effector to pick up the misaligned workpiece.

19. The elevator structure as set forth in claim 18, wherein the number of linearly extending members does not exceed the number of universal joints.

20. The elevator structure as set forth in claim 19, wherein the number of linearly extending members is three.

* * * * *

UNITED STATES PATENT AND TRADEMARK OFFICE
CERTIFICATE OF CORRECTION

PATENT NO. : 6,059,516
DATED : May 9, 2000
INVENTOR(S) : Genco Genov, et al.

Page 1 of 1

It is certified that error appears in the above-identified patent and that said Letters Patent is hereby corrected as shown below:

<u>Title page,</u>
After "San Jose," please delete "Alamdeu".
After "Alexander Todorov," please delete "executor".

Signed and Sealed this

Fourteenth Day of August, 2001

*Attest:*

NICHOLAS P. GODICI
*Attesting Officer*     *Acting Director of the United States Patent and Trademark Office*